(12) United States Patent
Wang et al.

(10) Patent No.: US 12,135,123 B2
(45) Date of Patent: Nov. 5, 2024

(54) FEATURE INSPECTION LIGHTING DOME

(71) Applicant: UnitX, Inc., Santa Clara, CA (US)

(72) Inventors: Boyun Wang, Santa Clara, CA (US);
Roman Balak, San Jose, CA (US);
Paul Lee Briel, San Jose, CA (US);
Yen-Chia Chu, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 36 days.

(21) Appl. No.: 17/972,373

(22) Filed: Oct. 24, 2022

(65) Prior Publication Data

US 2024/0133536 A1 Apr. 25, 2024
US 2024/0230059 A9 Jul. 11, 2024

(51) Int. Cl.
*G06T 7/00* (2017.01)
*F21V 3/04* (2018.01)
*F21V 3/10* (2018.01)

(52) U.S. Cl.
CPC ............. *F21V 3/049* (2013.01); *F21V 3/10* (2018.02); *G06T 7/0004* (2013.01)

(58) Field of Classification Search
CPC . F21V 3/049; F21V 3/10; F21V 15/01; F21V 7/22; F21V 19/001; G06T 7/0004; G06T 1/0007; G06T 2207/10152; G06T 7/521; G06T 7/80; G02F 1/133608; G02F 1/133603; G01N 2021/8845; G01N 2201/062; G01N 21/9036; G01N 2021/8816; G01N 2021/8887; G01N 2021/8924; G01N 21/88; G01N 21/8851; G01N 21/8901; G01N 2021/8812; G01N 2021/8835; G01N 21/909; F21S 8/00; F21Y 2115/10; G02B 6/0073; G06V 10/145;
(Continued)

(56) References Cited

U.S. PATENT DOCUMENTS

| 11,734,812 | B2 | 8/2023 | Wang |
| 11,763,442 | B2 | 9/2023 | Wang |
| 2006/0180775 | A1 | 8/2006 | Paradis |

(Continued)

FOREIGN PATENT DOCUMENTS

| DE | 102011008474 A1 * | 7/2012 | ................ F21S 4/22 |
| DE | 102015114955 A1 * | 3/2017 | ............. G03B 15/06 |

(Continued)

OTHER PUBLICATIONS

Search English translation of WO 2022128225 A1 (Year: 2022).*
(Continued)

*Primary Examiner* — Omar Rojas Cadima
(74) *Attorney, Agent, or Firm* — Schwegman Lundberg & Woessner, P.A.

(57) ABSTRACT

A feature inspection lighting system includes an outer cover having a mounting structure at a first end thereof and defining an outer periphery at a second end thereof. The cover includes an inner surface between the first end and the second end. The inner surface has raised surfaces defined thereon. A plurality of light sources is coupled to the raised surfaces of the inner surface of the cover, and cables to provide electrical power to the light sources is routed between the raised surfaces of the outer cover. The outer periphery of the cover may have a cutout defined therein through which all or part of an object to be inspected can pass.

19 Claims, 15 Drawing Sheets

(58) Field of Classification Search
CPC .................. G01B 9/0203; G03B 15/06; G03B 2215/0589
See application file for complete search history.

(56) References Cited

U.S. PATENT DOCUMENTS

| | | |
|---|---|---|
| 2016/0309070 A1 | 10/2016 | White |
| 2020/0051233 A1 | 2/2020 | Etzold et al. |
| 2021/0150700 A1 | 5/2021 | Wang |
| 2021/0342688 A1 | 11/2021 | Wang |
| 2022/0301144 A1 | 9/2022 | Wang |
| 2022/0301145 A1 | 9/2022 | Wang |

FOREIGN PATENT DOCUMENTS

| | | | |
|---|---|---|---|
| JP | 2008102103 | 5/2008 | |
| KR | 20140040511 | 4/2014 | |
| WO | WO-2022128225 A1 * | 6/2022 | ........... G02B 6/0045 |

OTHER PUBLICATIONS

Search English translation of DE 102011008474 A1 (Year: 2012).*
Search English translation of DE-102015114955-A1 (Year: 2017).*
"International Application Serial No. PCT US2023 026622, International Search Report mailed Oct. 18, 2023", 3 pgs.
"International Application Serial No. PCT US2023 026622, Written Opinion mailed Oct. 18, 2023", 5 pgs.

* cited by examiner

FEATURE INSPECTION LIGHTING DOME

FIELD OF THE INVENTION

This application relates to the field of inspection systems and light sources therefor, in some examples.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
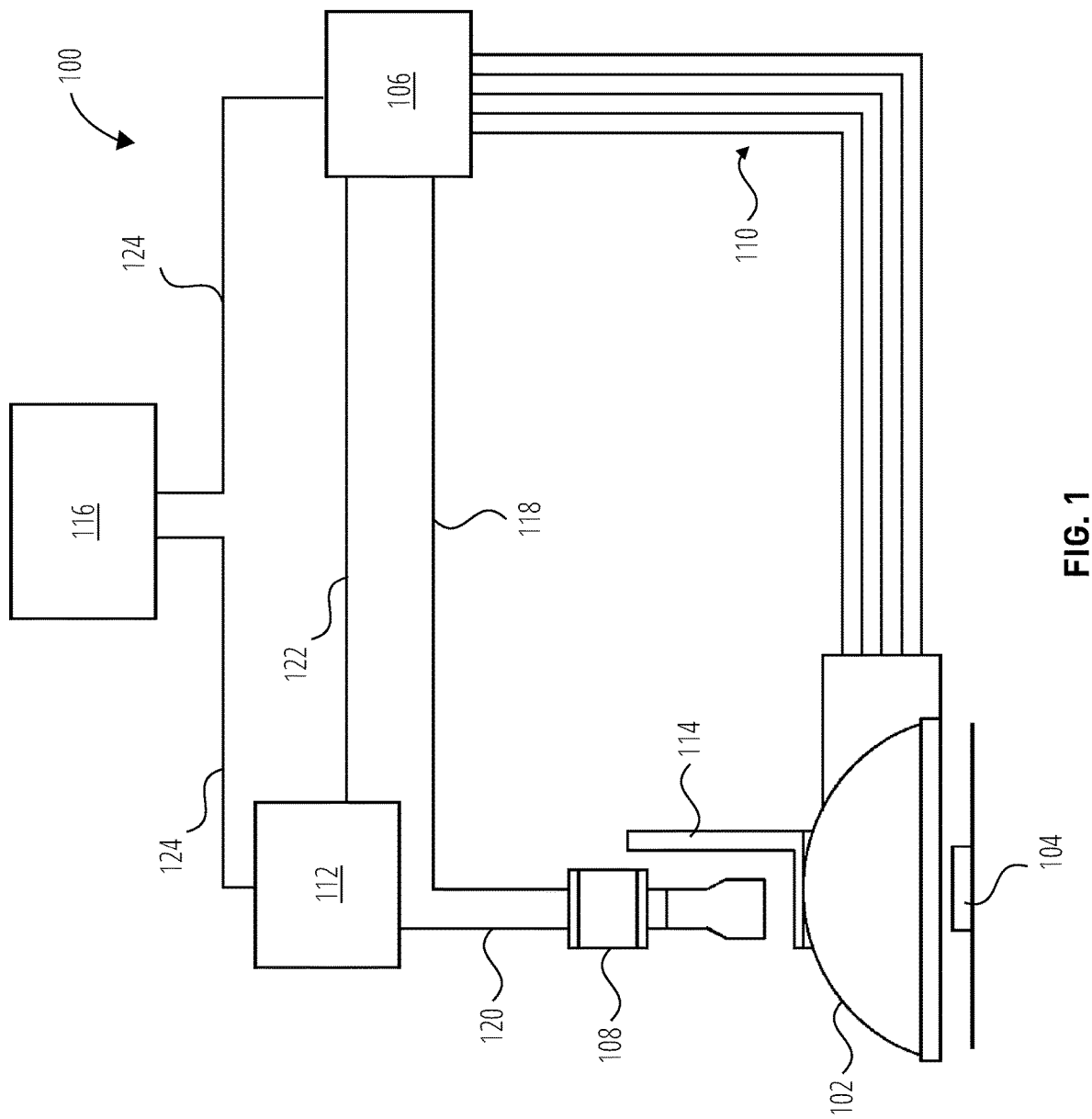
FIG. 1 illustrates a block diagram of an inspection system according to some examples.

In industrial production, image recognition is used to detect surface features on products, which include, for example, metal castings. However, when capturing images, a particular light source is frequently not ideal for imaging a product having a particular surface, a particular feature, and/or when inspected in a particular environment. For example, material characteristics that affect light quality of a captured image include reflective qualities, transparent qualities, or black/opaque qualities. In other examples, a particular light source may not be compatible with imaging different types of features including, for example, actual product features such as points, lines, circles, and so forth, as well as manufacturing defects or other unintended features such as scratches or the presence of dirt. In another example, a particular light source may not be good for creating satisfactory images in different environments, such as laboratories or production lines. The light quality of captured images directly affects the ability to detect surface features on products, and poor light quality may result in reduced accuracy when identifying such features.

Manufacturing currently faces many obstacles regarding the light sources used for capturing images of industrial products, as mentioned above. For different surface materials, such as materials with a reflective, transparent, or black surfaces, various wavelengths and patterns of light emitted by a light source to capture high-quality images have been conventionally necessary for adequate image quality. Further, conventional single light sources do not provide adequate lighting for image capture with multiple types of features or with different types of features such as product features, scratches, dirt, and features with random locations, sizes, or shapes. Such imagery has conventionally required customized light sources with specific incidence angles and patterns. Finally, conventional light sources have been inadequate for providing adequate lighting for image capture in various environments, because different environments, such as laboratories and production lines, typically produce products that are made from different materials under different ambient lighting conditions. Thus, capturing images with adequate quality for detecting features has relied on manual manipulation of distance and geometry between lighting, a camera, and the product, to capture high-quality images.

In some examples, the present disclosure uses customizable lighting configurations, in which incidence angles, patterns, and wavelength of light emitted by a light source can be provided in a single light source component. The light source component may thus adequately illuminate a product for high quality image capture in many conditions, such as multiple surface materials, feature types, and environments.

In some examples, provided is a feature inspection lighting system including an outer cover having a mounting structure at a first end thereof and defining an outer periphery at a second end thereof. The outer cover including an inner surface between the first end and the second end, and a plurality of light sources is coupled to the inner surface of the outer cover. The outer periphery of the outer cover may have a cutout defined therein through which all or part of an object to be inspected can pass. The light sources may comprise at least ten individually addressable light sources.

The plurality of light sources may be coupled to the outer cover by means of flexible substrates each including more than one light source. The flexible substrates may be mounted to raised surfaces defined on the inner surface of the outer cover in some examples. The flexible substrates may each include a connector for electrically connecting the light sources to a power source. The system may also further include cables for connecting the connectors to the power source, the cables being routed behind the flexible substrates between the raised surfaces.

In some examples, the system includes an inner cover coupled to the outer cover, the inner cover having apertures defined therein corresponding to positions of the plurality of light sources. A fixed diffuser may further be coupled to the outer cover, and a removable diffuser may be coupled to the outer cover over the fixed diffuser.

In some examples, a feature inspection lighting system includes an outer cover having a mounting structure at a first end thereof and defining an outer periphery at a second end thereof. The outer cover includes an inner surface between the first end and the second end, the inner surface having raised surfaces defined thereon. A plurality of light sources is coupled to the raised surfaces of the inner surface of the outer cover, and cables provide electrical power to the plurality of light sources, the cables being routed between the raised surfaces of the outer cover.

The plurality of light sources may be coupled to the raised surfaces by flexible substrates, the cables being routed between the raised surfaces of the outer cover underneath the flexible substrates. In some examples, the light sources may comprise at least ten individually addressable light sources.

The outer periphery of the outer cover may be generally rectangular with four corner regions, and the plurality of light sources may be arranged in a plurality of rings between the mounting structure and the outer periphery, with an additional light source located in each of the corner regions.

The system may further include an inner cover coupled to the outer cover, the inner cover having apertures defined therein corresponding to positions of the plurality of light sources.

The system further includes a fixed diffuser coupled to the outer cover, and a removable diffuser may be coupled to the outer cover over the fixed diffuser.

The outer periphery of the outer cover may have a cutout defined therein through which all or part of an object to be inspected can pass.

Other technical features may be readily apparent to one skilled in the art from the following figures, descriptions, and claims.

FIG. 1 illustrates a block diagram of an inspection system 100 according to some examples. The inspection system 100 includes a light dome 102, a camera 108, a controller 106, an industrial computer 112, and a factory computer 116. The factory computer 116 is in communication with controller 106 and the computer 112 via a wired or wireless factory network 124.

The light dome 102 in use illuminates a target object 104, such as a metal casting or other product. The light dome 102 includes a housing containing a number of light sources as will be described in more detail below. In some examples, the light sources comprise a plurality of LEDs or display screens arranged to provide flexibility in illuminating the target object 104. The light sources are selectively activated by the controller 106 using power cables 110. A light source is a unit of lighting that is individually addressable by the controller 106 to illuminate the target object 104. An individual light source may thus comprise a single LED or a number of LEDs that are addressable as a group. A light source may also comprise a subset of a light generating unit, such as a group or block of pixels in a flexible display screen. Preferably the light dome 102 includes at least ten individually addressable light sources arranged within the light dome 102, to provide lighting flexibility.

The camera 108, which may be mounted to the light dome 102 by a bracket 114, captures images of the illuminated target object 104 through a hole in the top of the light dome 102. The camera 108 is triggered by the controller 106 via a trigger line 118, synchronized to the actuation of the light sources in light dome 102.

The controller 106 controls operation of the camera 108 and illumination of the target object 104 by the light dome 102. The controller 106 receives instructions from the computer 112 via a control line 122. The controller 106 may be implemented by a hardware processor disposed in the camera 108. The controller 106 may further include hardware components that may include a combination of Central Processing Units ("CPUs"), buses, volatile and non-volatile memory devices, storage units, non-transitory computer-readable media, data processors, processing devices, control devices transmitters, receivers, antennas, transceivers, input devices, output devices, network interface devices, and other types of components that are apparent to those skilled in the art. These hardware components within the user device may be used to execute the various applications, methods, or algorithms disclosed herein independent of other devices disclosed herein.

The controller 106 illuminates the target object according to one or more optimal lighting configurations. The lighting configurations may be defined as a matrix, where each value of the lighting configuration matrix represents a working status of each independently controllable light source, such as one or more LEDs and/or groups of pixels on a flexible display screen. The matrix may also include brightness or color values for particular configurations. The lighting configurations may also be arranged into a configuration sequence, which specifies an order of lighting configurations to be executed for a particular target object 104, such that a number of images under different lighting conditions are captured by the camera 108

The computer 112 runs software that provides a user interface that can be used to specify lighting configurations and sequences, which can be loaded into the controller 106. The computer 112 also instructs operation of the controller 106 via the control line 122, and receives images captured by the camera 108 via a data line 120.

The factory computer 116 provides overall factory control, and can receive operational data and captured images from the controller 106 and the computer 112 via the factory network 124. The factory computer 116 can also provide instructions to control or initiate operation of the inspection system 100, based for example on other factory operations such as the movement of target objects 104 past the light dome 102.

Figure 2:
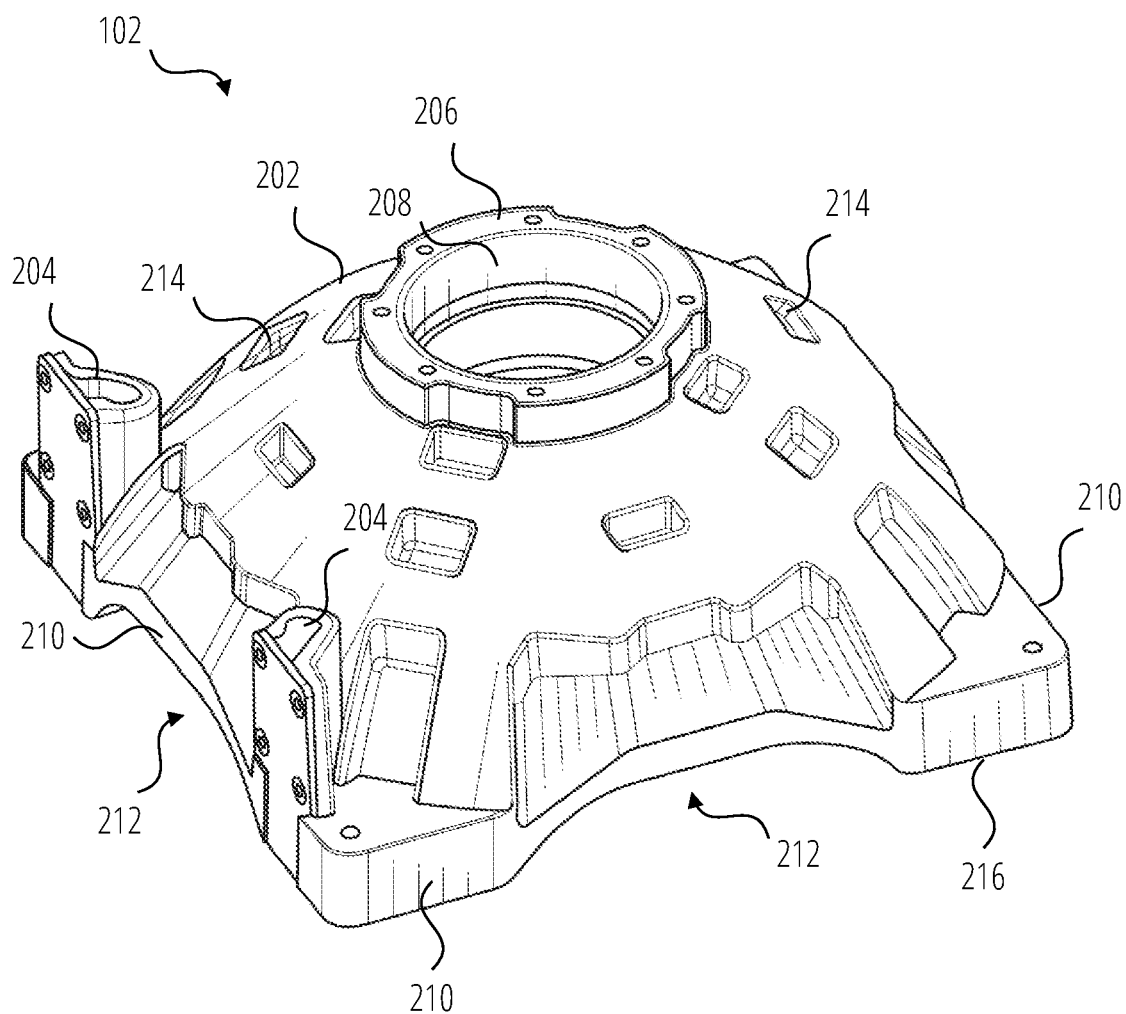
FIG. 2 illustrates a perspective view of the light dome of the inspection system of FIG. 1, according to some examples.

FIG. 2 illustrates a perspective view of the light dome 102 of FIG. 1, according to some examples. Visible in FIG. 2 is an outer cover 202 of the light dome 102, which includes a mounting ring 206 to which the camera 108 can be mounted. The mounting ring 206 is located around the upper edge of a ring 208 that defines an opening in the light dome 102 at a first or upper end, through which the camera 108 has a view of the target object 104.

Two cable exits 204 are also provided, through which the power cables 110 are routed to provide power to the light sources within the light dome 102. The cable exits 204 are located at one or more corners of the light dome 102, to permit more space and flexibility when mounting the camera 108 to the mounting ring 206.

In some examples, the light dome 102 includes four lower side walls 210, each including a lower edge or outer periphery 216 at a lower or second end of the light dome 102, with a cutout 212 defined therein through which all or part of the target object 104 can pass, for example on a conveyor belt. The cutouts 212 permit the light dome 102 to be mounted lower to the target object 104 or conveyor belt, and also provides better exclusion of ambient light. As can be seen in the figures, the outer periphery 216 is generally rectangular in shape; in the illustrated example, square in shape.

Also illustrated in FIG. 2 are a number of recesses 214 in the outer cover 202, which correspond to islands on the interior of the outer cover 202 to which light sources can be mounted. In some examples, the outer cover 202 is made of metal, to provide good heat transfer qualities between the light sources and the upper surface of the outer cover 202.

Figure 3:
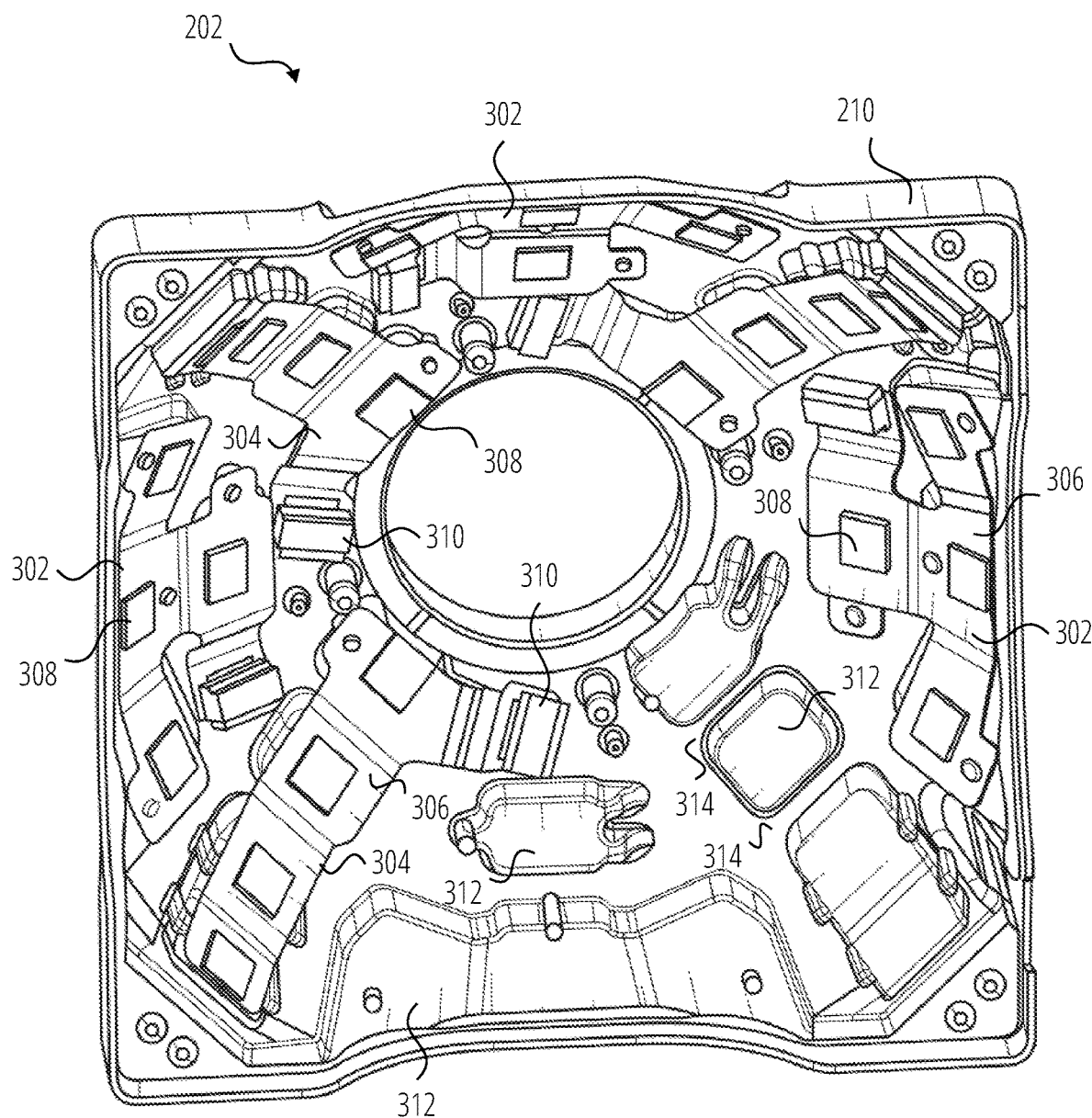
FIG. 3 illustrates a perspective view of the underside of the light dome of FIG. 2, showing the positioning of PCBs including light sources, according to some examples.

FIG. 3 illustrates a perspective view of the underside of the light dome 102 of FIG. 2, showing the positioning of PCBs including light sources, such as LEDs, according to some examples. In this view, some of the PCBs have been removed to show the detail of the underside of the outer cover 202 in addition to the positioning of the LEDs.

The underside of the light dome 102 is generally hemispherical in shape, and includes four T-shaped PCBs 302 and four L-shaped PCBs 304 mounted thereto, according to some examples. In this view, the L-shaped PCB 304 on the lower left side is not shown, and the T-shaped PCB 302 on the left side is not shown.

Each PCB includes a substrate 306, a connector 310 and a number of high-powered LEDs 308 for providing selective illumination of the target object 104 under control of the controller 106. As can be seen from the figure, the underside of the outer cover 202 includes a number of islands or pads 312, which define raised surfaces on the underside of the outer cover 202 for supporting each of the T-shaped PCBs 302 and the L-shaped PCBs 304. The locations of the pads 312 corresponds to the locations of the LEDs 308, and thermal paste is provided between each pad 312 and LEDs 308 to facilitate heat transfer from the LEDs to the light dome 102.

Channels 314 are defined between the pads 312 for the routing of power cables 110 from the connectors 310 to the cable exits 204. The power cables 110 are routed underneath adjacent PCBs in the channels 314.

Figure 4:
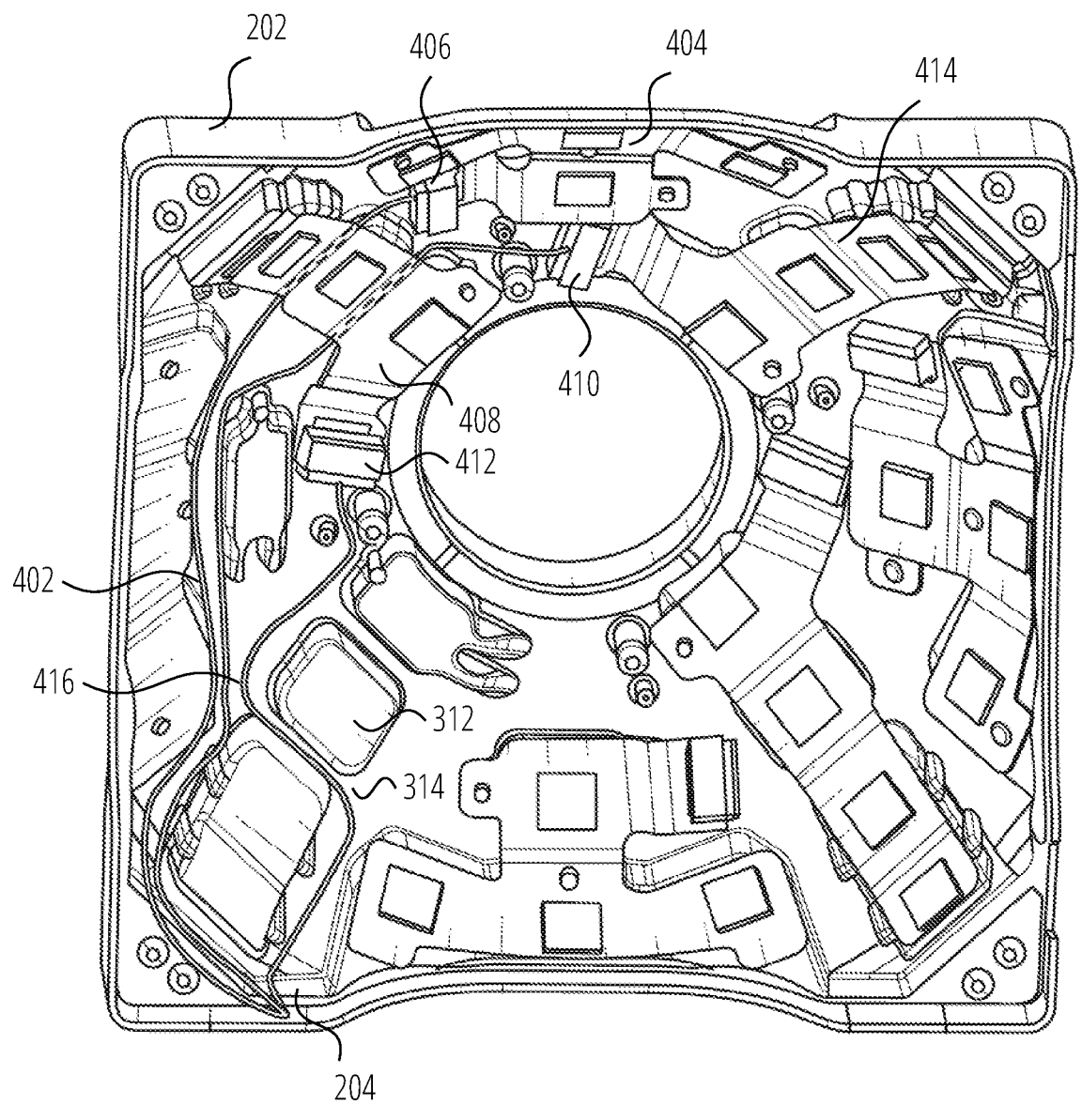
FIG. 4 illustrates a perspective view of the underside of the light dome of FIG. 2, showing the routing of power cables, according to some examples.

FIG. 4 illustrates a perspective view of the underside of the light dome 102 of FIG. 2, showing the routing of power cables 110, according to some examples. As can be seen, a power cable 402 is routed from the connector 406 of T-shaped PCB 404 and from the connector 410 of L-shaped PCB 414 to a cable exit 204. The power cables 402 pass underneath L-shaped PCB 408 via channels 314 between pads 312 to which L-shaped PCB 408 is mounted.

Similarly, a power cable 416 is routed from connector 412 of L-shaped PCB 408 to the cable exit 204, passing underneath an L-shaped PCB (not shown) via one of the channels 314.

The arrangement of the PCBs and associated LEDs and the cable routing between the pads 312 provides a compact arrangement that nevertheless facilitates heat transfer from the LEDS 308 to the outer cover 202.

Figure 5:
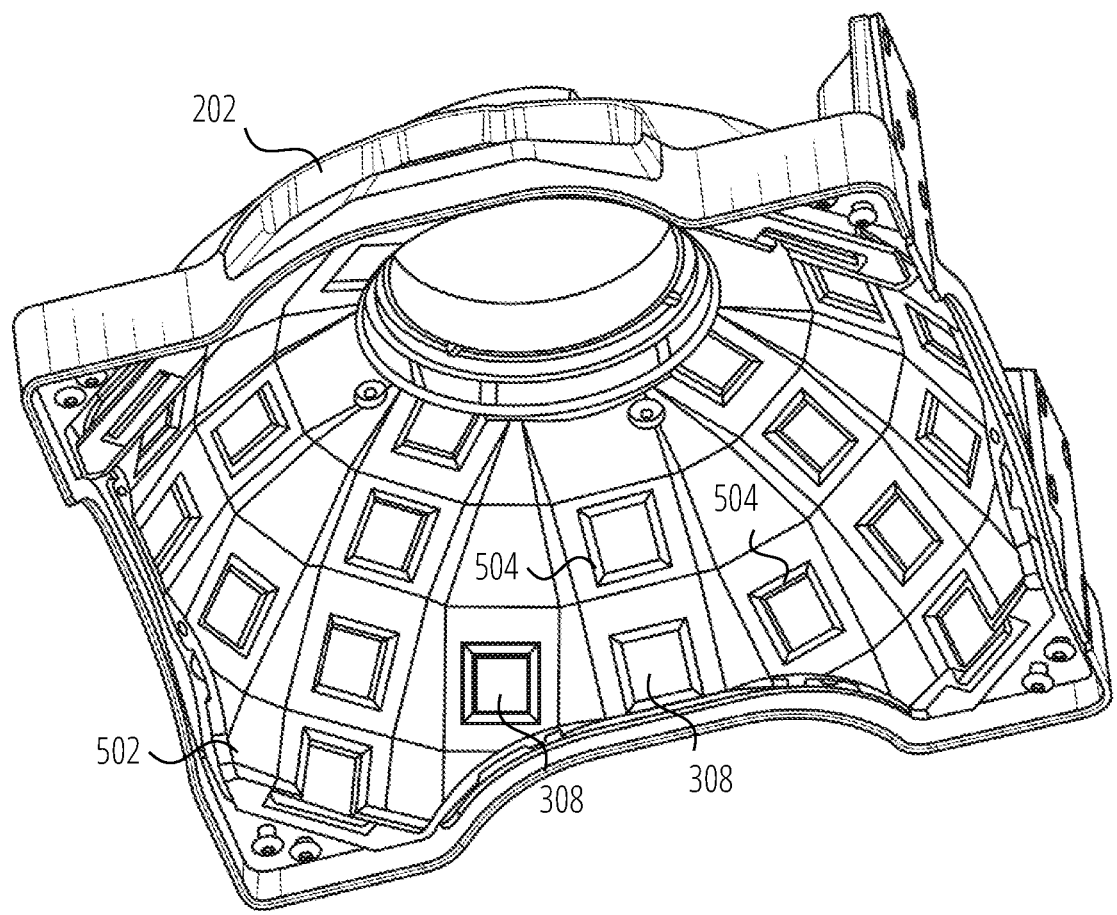
FIG. 5 illustrates a perspective view of the underside of light dome of FIG. 2, including an inner cover, according to some examples.

FIG. 5 illustrates a perspective view of the underside of light dome 102 of FIG. 2, including an inner cover 502, according to some examples. The inner cover 502 is mounted to the outer cover 202, and includes a number of apertures 504 through which the LEDs 308 are visible and can provide the required illumination. The inner cover 502 also seals the PCBs and power cables 110 inside the light dome 102 between the outer cover 202 and the inner cover 502, to keep dust from getting into or out of the volume containing the PCBs.

Figure 6:
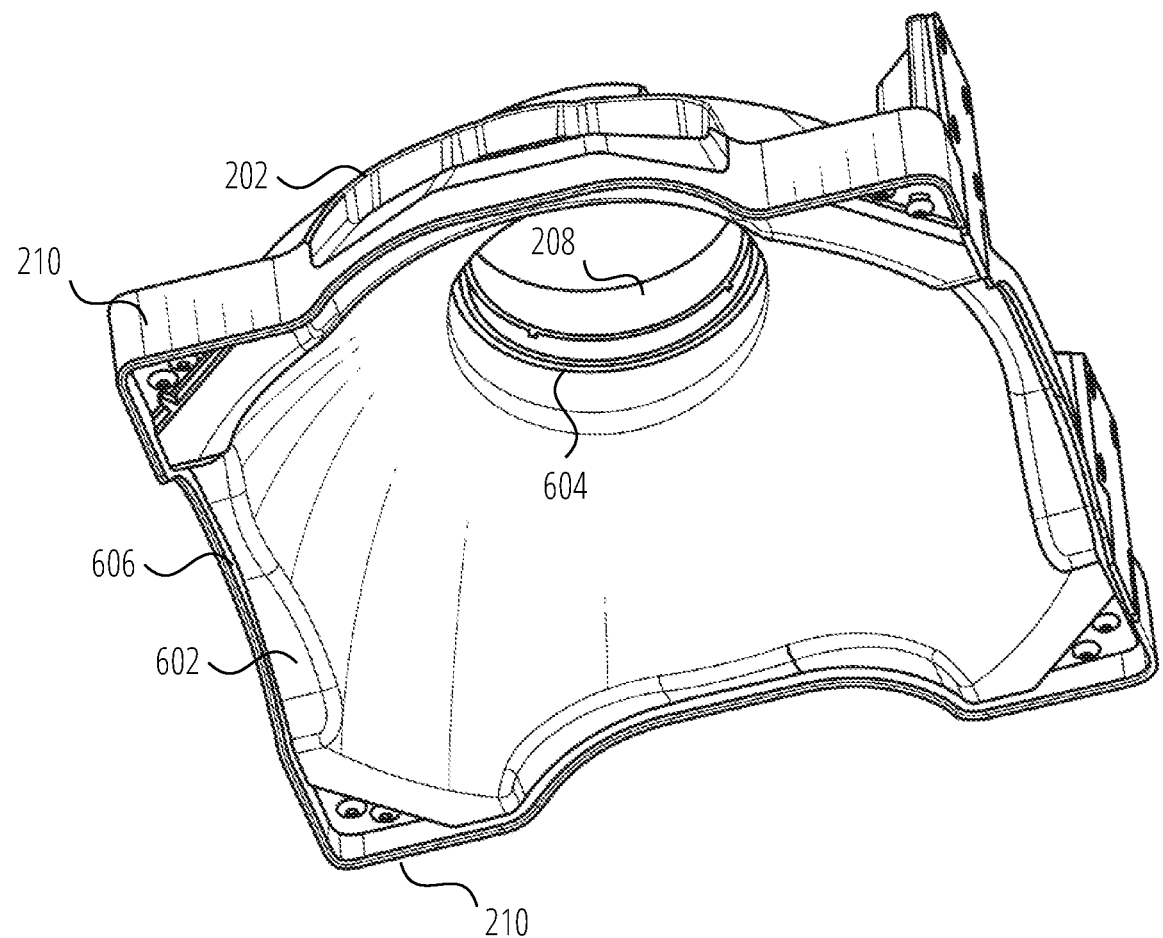
FIG. 6 illustrates a perspective view of the underside of light dome of FIG. 2, including a fixed diffuser, according to some examples.

FIG. 6 illustrates a perspective view of the underside of light dome 102 of FIG. 2, including a fixed diffuser 602, according to some examples. As the name suggests, the fixed diffuser 602 scatters the light provided by the LEDs 308 to create more uniform illumination of the target object 104. The fixed diffuser 602 has a circular upper edge 604 that seals against a lower edge of the ring 208 of the outer cover 202. An outer edge 606 corresponds with and seals against the inside of the side walls 210 of the outer cover 202. In some examples, the fixed diffuser 602 is a clear diffuser.

Figure 7:
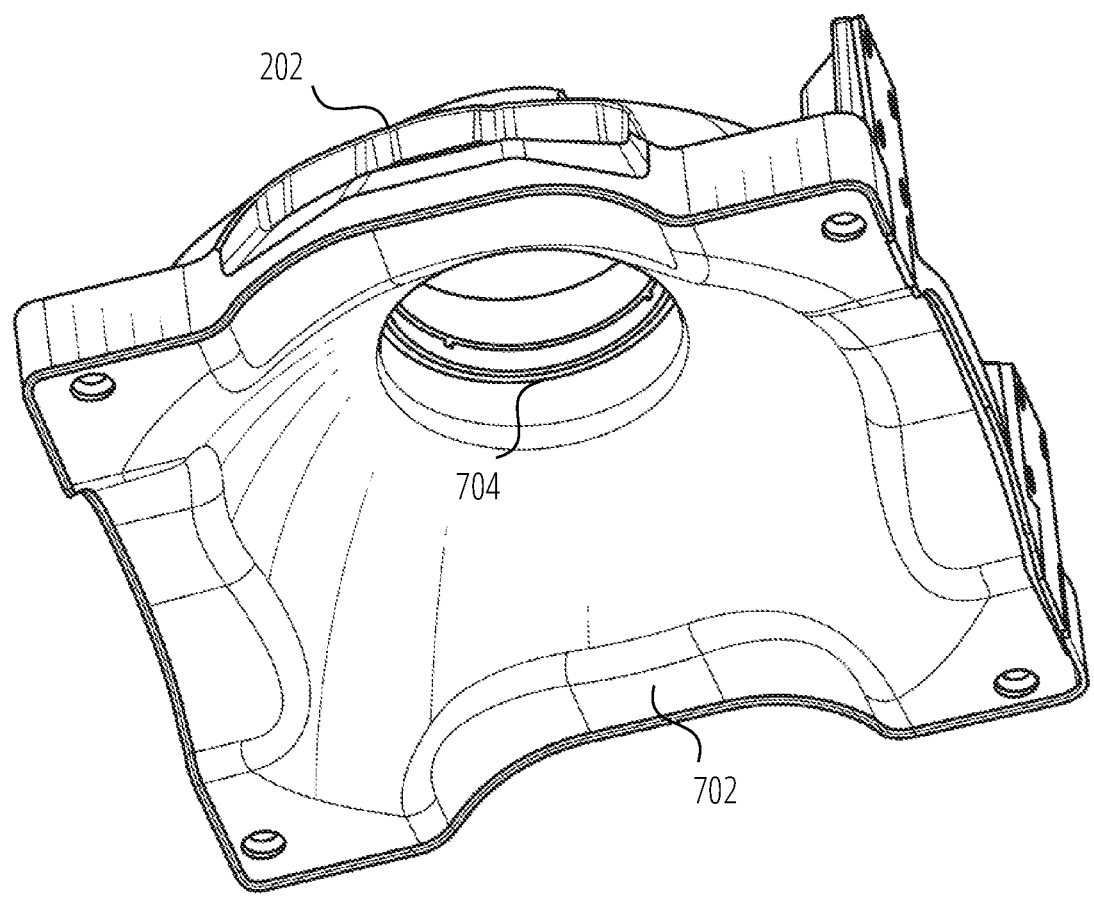
FIG. 7 illustrates a perspective view of the underside of light dome of FIG. 2, including a removable diffuser, according to some examples.

FIG. 7 illustrates a perspective view of the underside of light dome 102 of FIG. 2, including a removable diffuser 702, according to some examples. The removable diffuser 702 is part of a set of diffusers than can provide alternative light scattering to the fixed diffuser 602. The removable diffuser 702 also has a circular upper edge 704 that rests against a lower edge of the fixed diffuser 602. An outer edge 606 corresponds with and rests against the inside of the side walls 210 of the outer cover 202.

Figure 8:
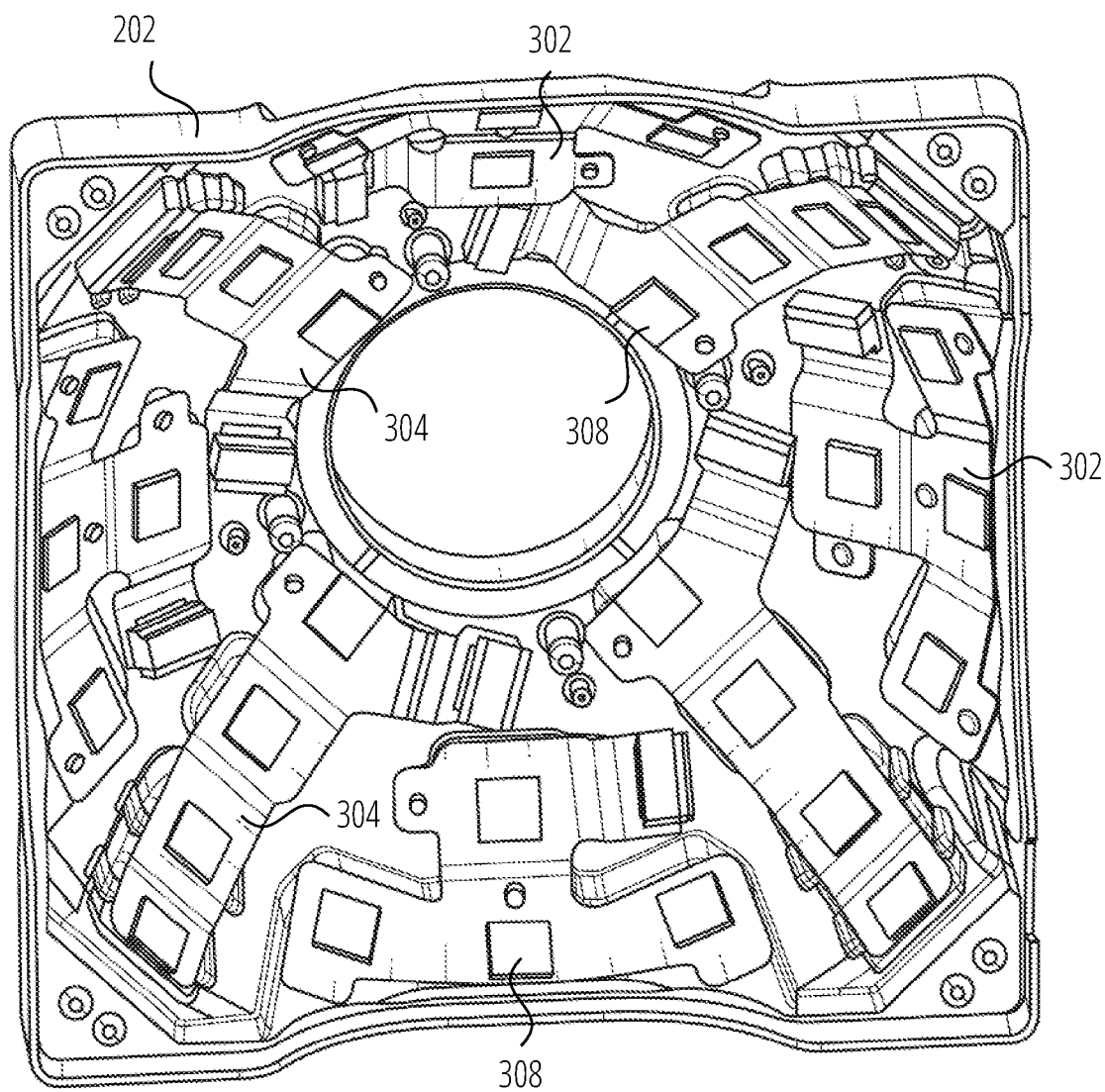
FIG. 8 illustrates a perspective view of the underside of the light dome of FIG. 2, showing the positioning of PCBs including light sources, according to some examples.

FIG. 8 illustrates a perspective view of the underside of the light dome 102 of FIG. 2, showing the positioning of PCBs including light sources, such as LEDs, according to some examples. In this view, all of the T-shaped PCBs 302 and L-shaped PCBs 304 are included to show the layout of the LEDs 308.

Figure 9:
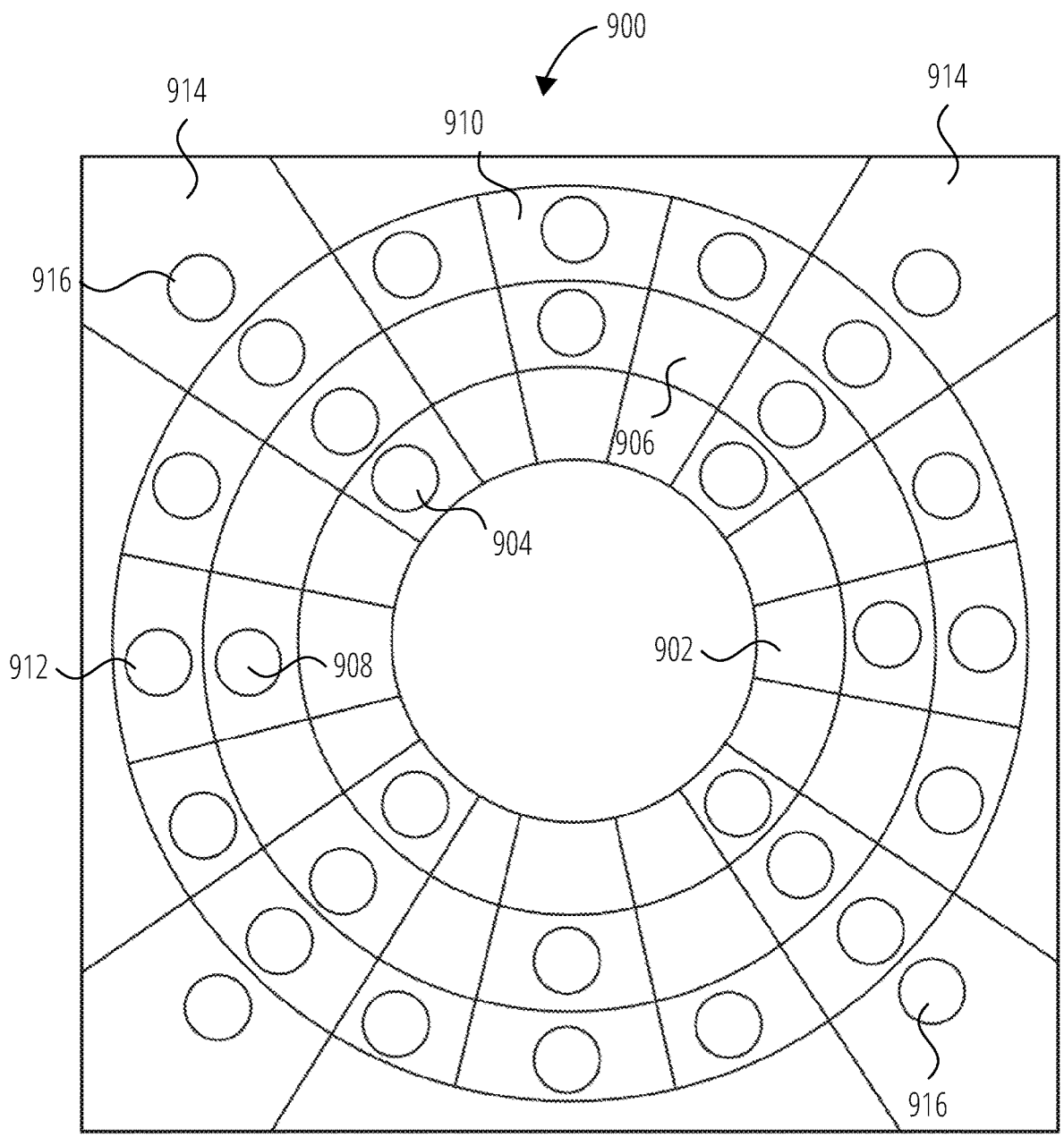
FIG. 9 illustrates a layout of the light sources of the light dome of FIG. 2, according to some examples.

FIG. 9 illustrates the layout 900 of the LEDs 308 of the light dome 102 of FIG. 2, according to some examples. The LEDs are symmetrically arranged as four inner ring LEDs 904 in an inner ring 902, eight middle ring LEDs 908 in a middle ring 906, and sixteen outer ring LEDs 912 in an outer ring 910. To provide additional light coverage, four corner LEDs 916 are located at corner positions 914.

Figure 10:
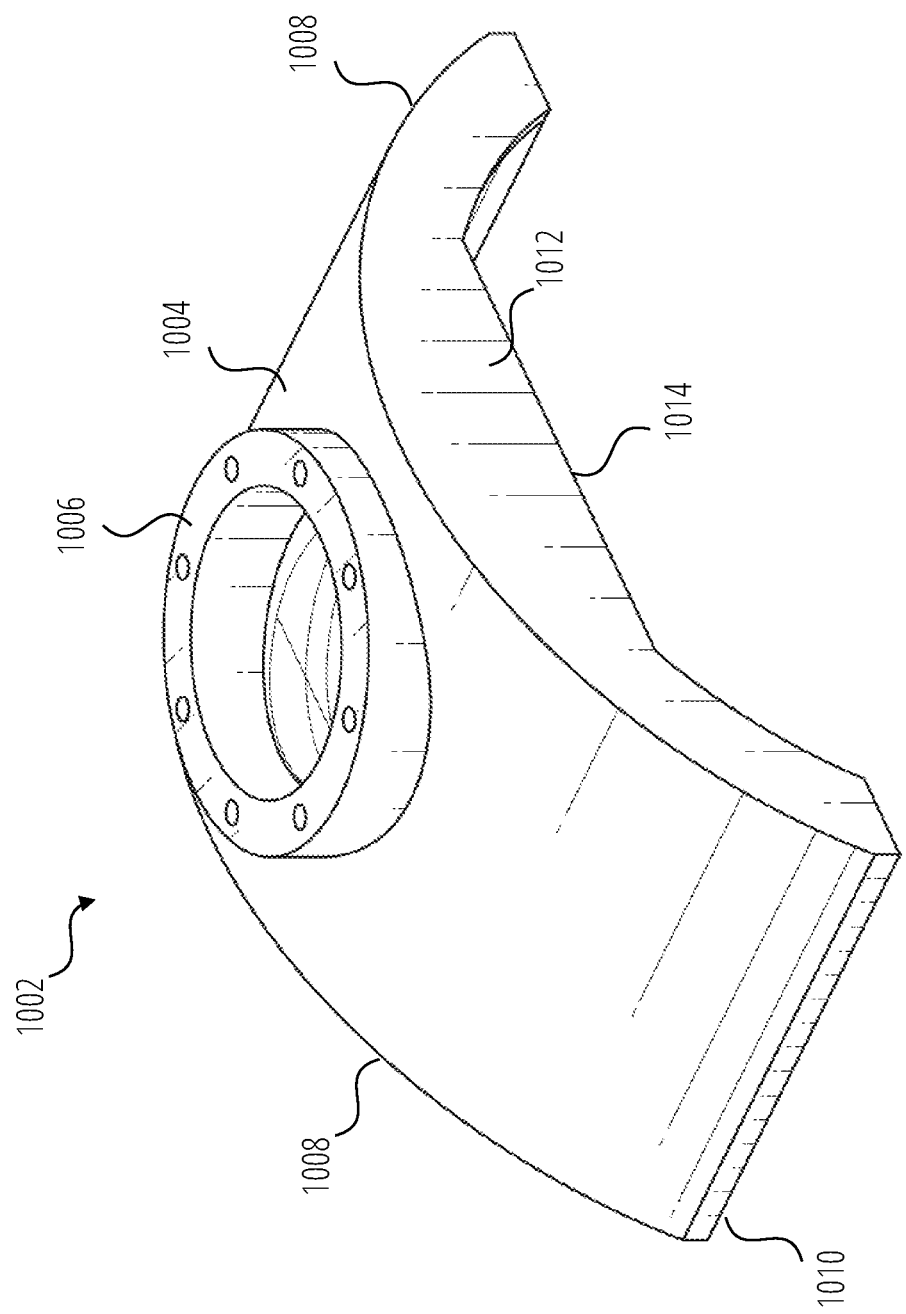
FIG. 10 and FIG. 11 illustrate perspective views of an alternative shape of a light dome, according to some examples FIG. 11 illustrate a lower perspective view of the outer cover 1004 of the light dome 1002 of FIG. 10, according to some examples.

FIG. 10 illustrate an upper perspective views of an alternative shape of a light dome, according to some examples. The light domes 1002 is arch-shaped, and include an outer cover 1004 with a mounting ring 1006 to which a camera 108 can be mounted, as for the light dome 102.

As can be seen, the light dome 1002 includes two curved edges 1008 and two straight edges 1010 at the periphery of the outer cover 1004. The curved edges 1008 may form circular arches in some examples, but other arch-like shapes are contemplated. The arch shape of the light domes 1002 permit a number of the light domes 1002 to be arranged next to each other with their respective curved edges 1008 adjacent to each other, to form a line of light domes 1002 (see FIG. 12) that can be used to image a number of different parts simultaneously, or to provide a number of sequential image captures with different illumination as a part moves underneath each light dome 1002. In the latter case, the line of light domes 1002 would be arranged along the line of travel of the part. The line of light domes 1002 could also be arranged transverse to the line of travel, to take sequential lines of images representing strips across a large part, or to take images of smaller parts travelling parallel to each other.

Additionally, lines of such light domes 1002 can be arranged next to each other with their straight edges 1010 adjacent to each other, to provide a matrix of light domes 1002. Such a matrix of light domes 1002 can be useful for imaging a large part, such as an LED or LCD flat screen for a television or display monitor.

The outer cover 1004 includes a side wall 1012 with a lower edge 1014. The side wall 1012 as shown is provided on both sides of the outer cover 1004, and serves both to exclude light from outside the light dome 1002 as well as to reduce the amount of light leaving the light dome 1002 that might affect the lighting conditions provided by an adjacent light dome 1002. In some examples, the side wall 1012 may extend further down for use on the end of a line of light domes 1002, to reduce the effect of ambient lighting in the environment. The side walls 1012 also prevent or reduce the amount of light leaving the light dome 1002 when light sources in the light dome 1002 are illuminated.

Figure 11:
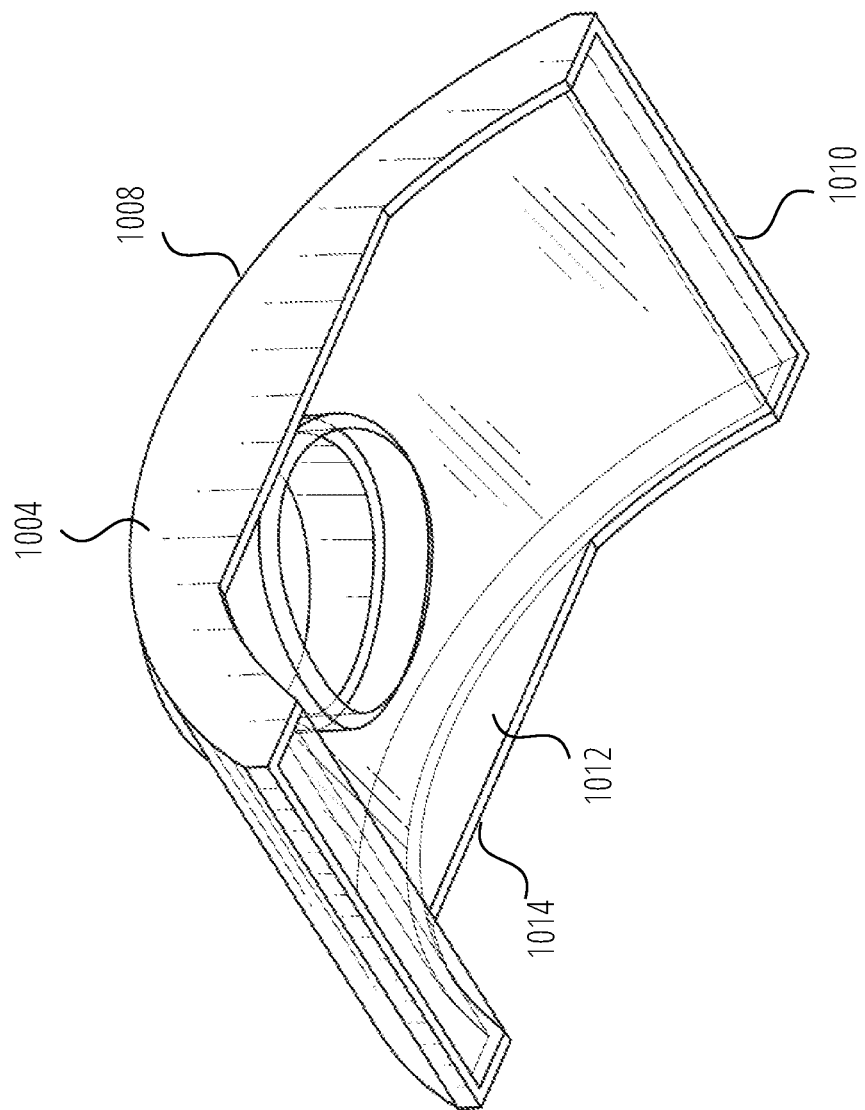

FIG. 11 illustrate a lower perspective view of the outer cover 1004 of the light dome 1002 of FIG. 10, according to some examples. Seen in FIG. 11 are the straight edges 1010, the curved edges 1008, the side walls 1012, and the lower edges 1014 of the side walls 1012.

The various internal and external structures comprising the light dome 1002 are the same as described above with reference to the light dome 102, with appropriate modifications. For conciseness and simplicity, not all features of the light dome 1002, such as cable exits, are shown in FIG. 10 and in FIG. 11.

Figure 12:
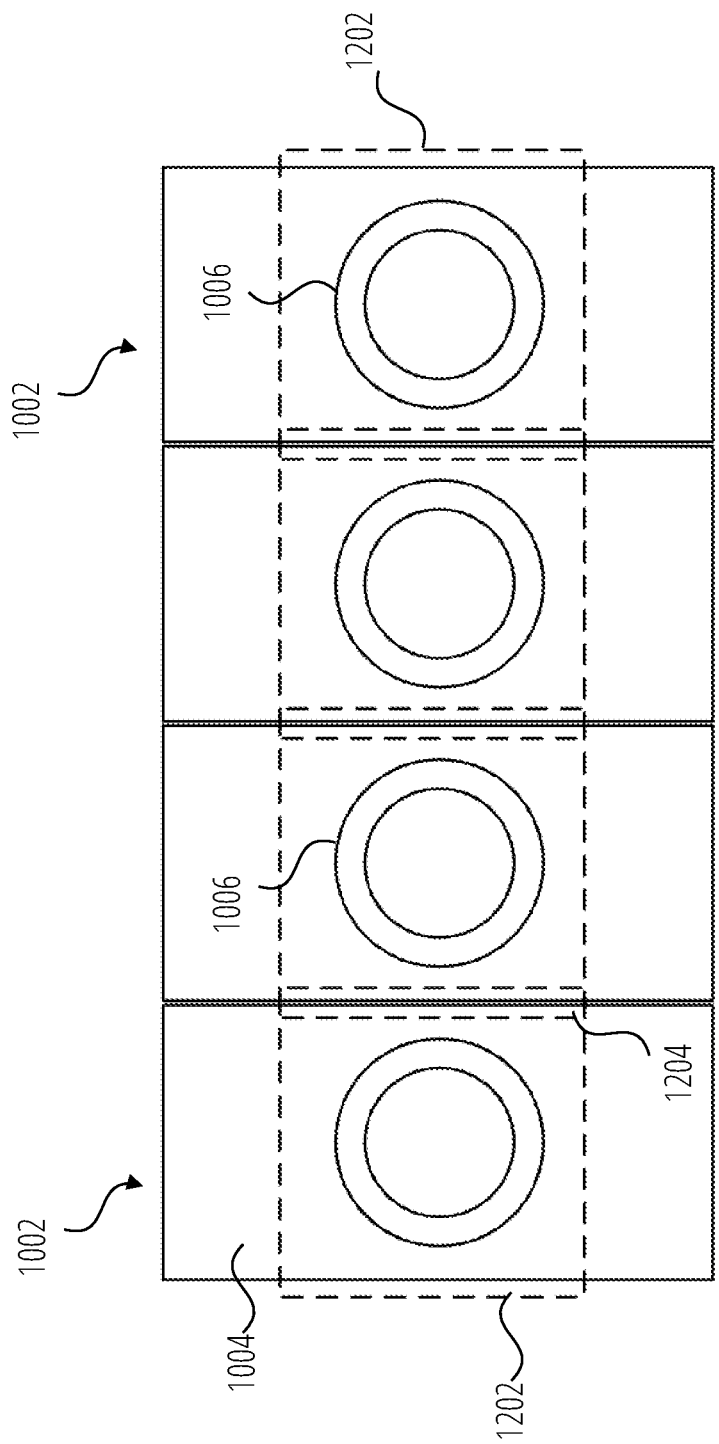
FIG. 12 illustrates a plan view of a line of the light domes of FIG. 10, according to some examples.

FIG. 12 illustrates a plan view of a line of the light domes 1002 of FIG. 10, according to some examples. Each light dome 1002 has a camera and illumination field of view 1202. As can be seen, the configuration of the side walls 1012 and lower edge 1014 and the arrangement of the lighting within the light domes 1002 provides a small field of view overlap 1204 between adjacent light domes 1002. The field of view overlap 1204 ensures that all areas of a part under inspection are captured. The field of view 1202 of a camera 108 is however not limited by the design of the light dome 1002, but is defined by the camera lens. Therefore, if needed, the camera and the lens can achieve a larger field of view. However, lighting quality may not be ideal in such a case.

The field of view overlap shown in FIG. 12 provides coverage in the X-direction in the figure. In the case of a matrix of light domes 1002 used for the inspection of a large part, the part can be moved relative to the light domes 1002 in the Y-direction in the figure to address the lack of overlap in the Y-direction.

Figure 13:
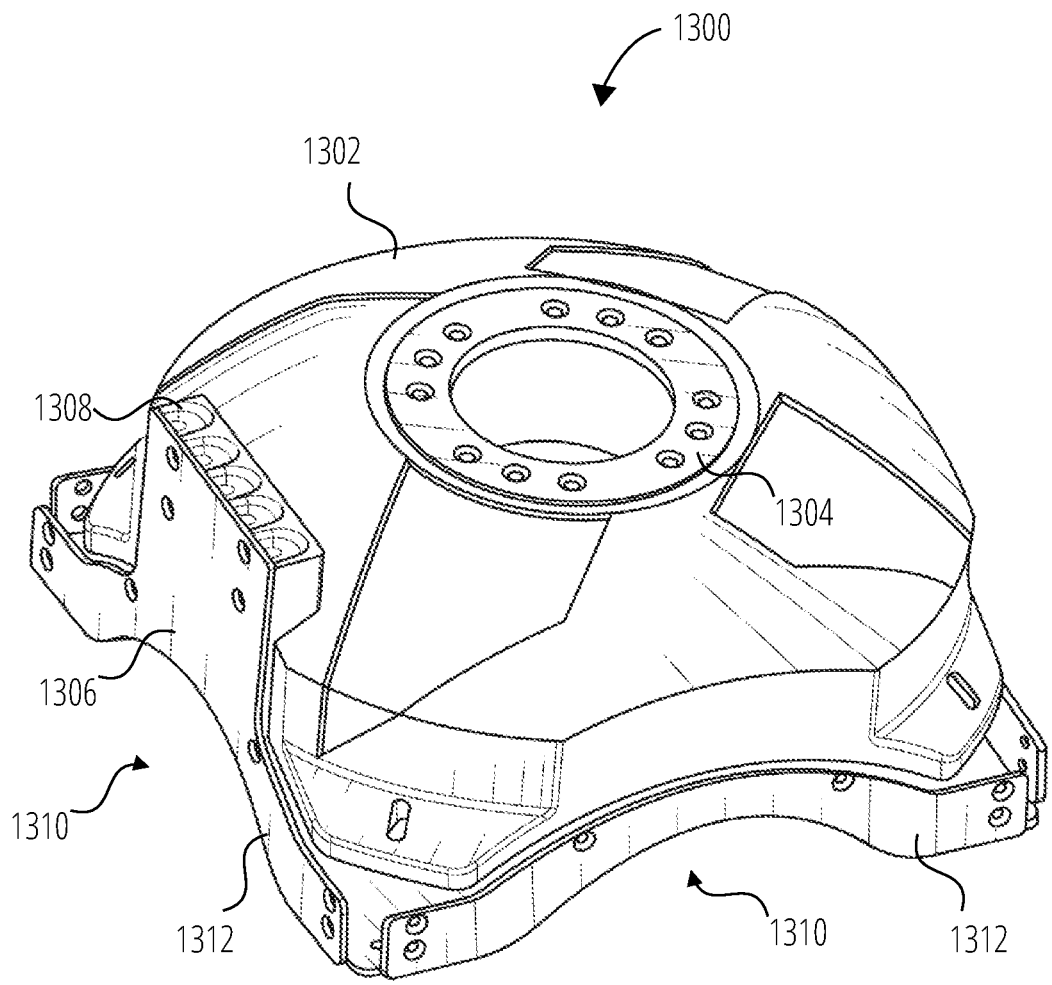
FIG. 13 illustrates a perspective view of a light dome, according to some examples.

FIG. 13 illustrates a perspective view of a light dome 1300, according to some examples. The light dome 1300 includes outer cover 1302 and a housing 1306 to which the outer cover 1302 is mounted. The housing 1306 includes a mounting ring 1304 to which the camera 108 can be mounted. As before, the mounting ring 1304 surrounds an opening in the light dome 1300 through which the camera 108 has a view of the target object 104.

Cable exits 1308 are also provided, through which the power cables 110 are routed to provide power to the light sources within the light dome 1300.

In some examples, the light dome 1300 includes four lower side walls, each including a lower edge, with a cutout 1310 defined therein through which all or part of the target object 104 can pass, for example on a conveyor belt. The cutouts 1310 permit the light dome 1300 to be mounted lower to the target object 104, and also provides better exclusion of ambient light.

Figure 14:
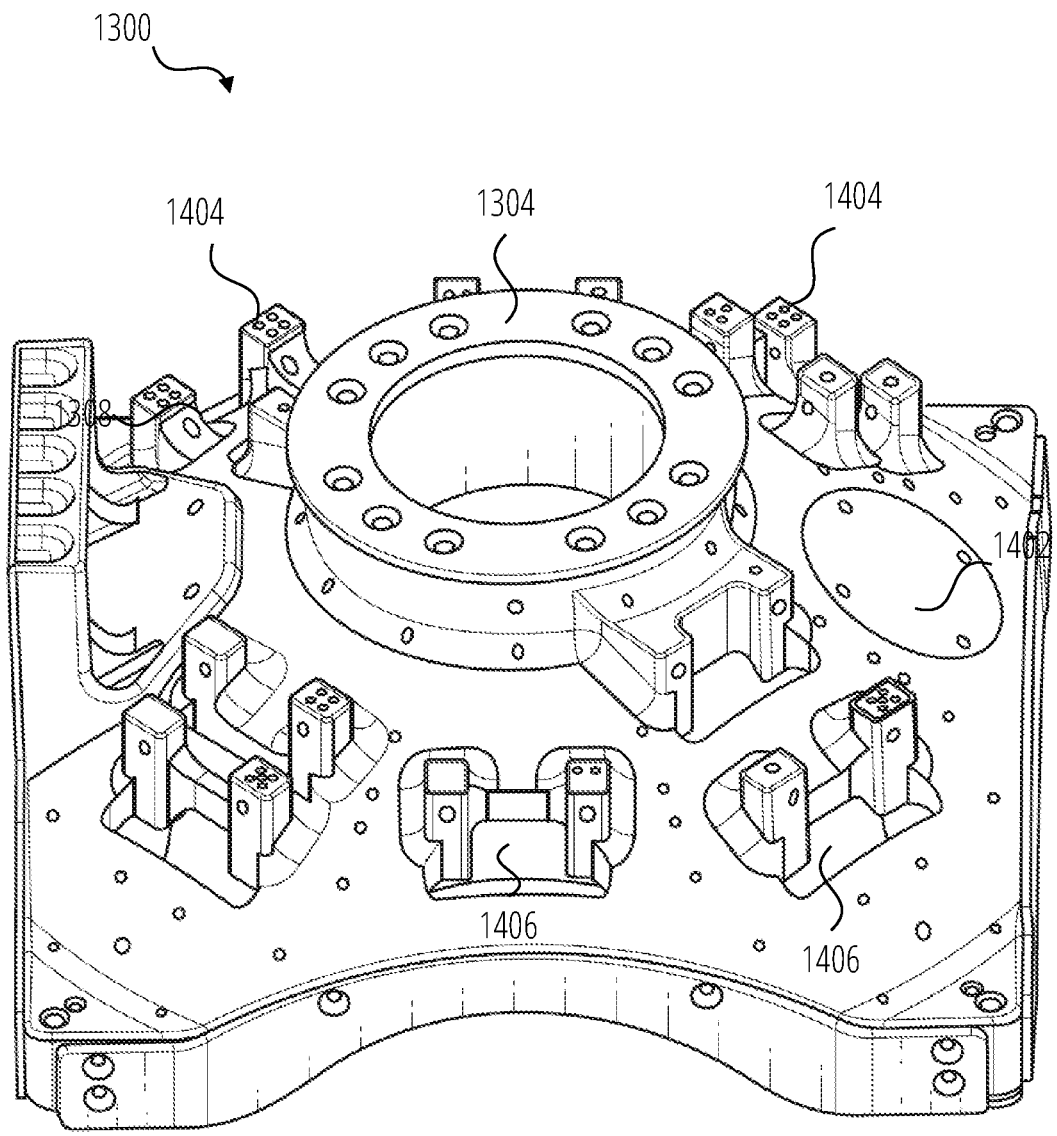
FIG. 14 illustrates a partially disassembled perspective view of the light dome of FIG. 13, according to some examples.

FIG. 14 illustrates a partially disassembled perspective view of the light dome 1300 of FIG. 13, according to some examples. In FIG. 14, the outer cover 1302 has been removed to reveal an inner cover 1402. The inner cover 1402 includes a number of PCB connector mounts 1404 to which the connectors of PCBs (not shown) containing LEDs are mounted. The PCBs are mounted to the underside of the inner cover 1402 and exit the inner cover 1402 through a number of PCB apertures 1406 located adjacent to the PCB connector mounts 1404. Power cables 110 are routed from the PCB terminals out of the light dome 1300 via the cable exit 1308.

Figure 15:
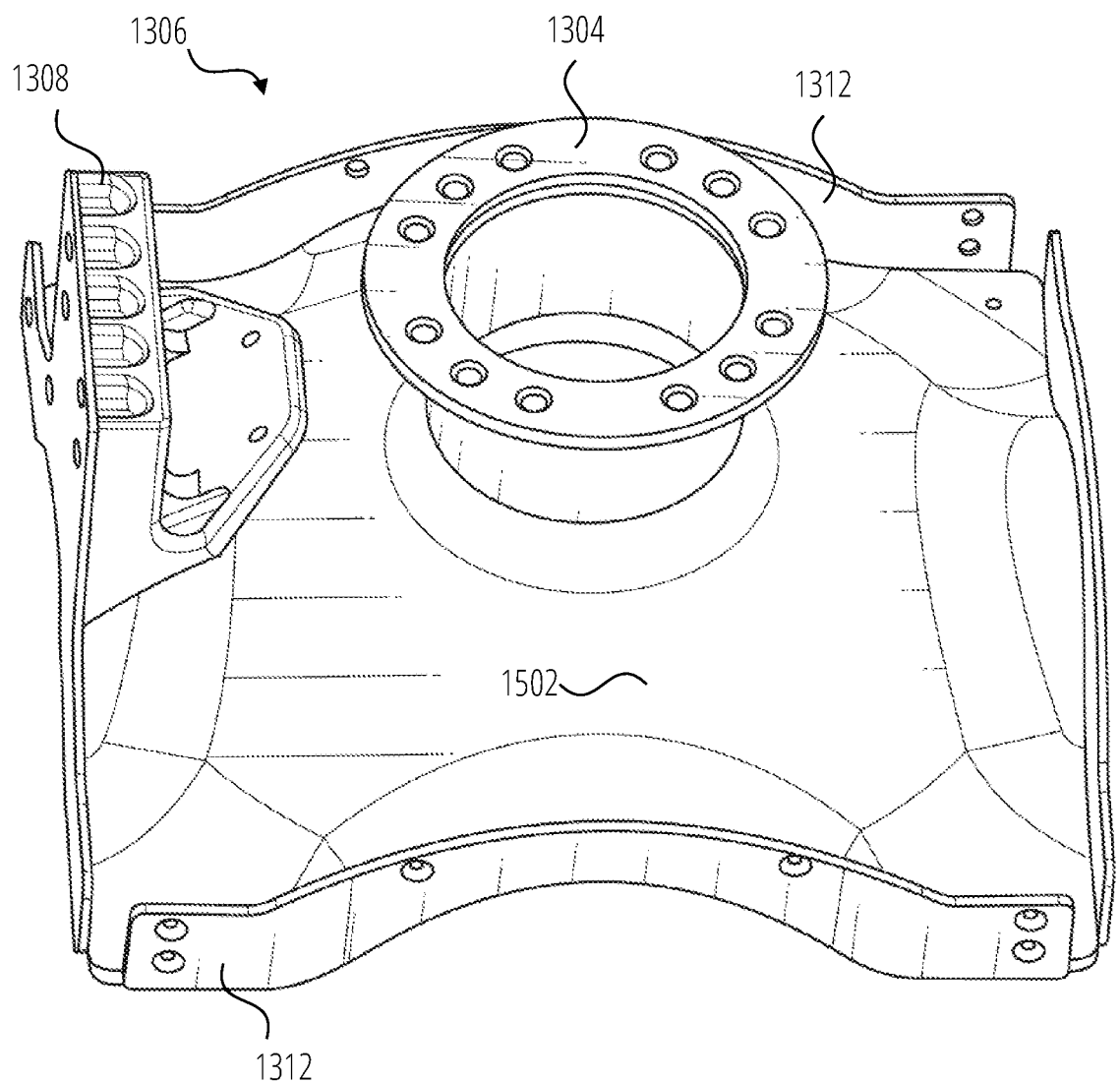
FIG. 15 illustrates a perspective view of the housing of light dome of FIG. 13, according to some examples.

FIG. 15 illustrates a perspective view of the housing 1306 of light dome 1300 of FIG. 13, according to some examples. As mentioned, the housing 1306 includes four side walls 1312, a mounting ring 1304 and a cable exit 1308. Also shown is the translucent floor 1502, through which the LEDs located on the PCBs that are mounted to the underside of the inner cover 1402 can illuminate a target object 104 under control of the controller 106.

The invention claimed is:

1. A feature inspection lighting system, comprising:
    an outer cover having a mounting structure at a first end thereof and defining an outer periphery at a second end thereof, the outer cover including an inner surface between the first end and the second end;
    a plurality of light sources coupled to the inner surface of the outer cover; and
    an inner cover coupled to the outer cover, the inner cover having apertures defined therein corresponding to positions of the plurality of light sources,
    wherein the outer periphery of the outer cover has a cutout defined therein through which all or part of an object to be inspected can pass.

2. The feature inspection lighting system of claim 1, wherein the light sources comprise at least ten individually addressable light sources.

3. The feature inspection lighting system of claim 1, further comprising a fixed diffuser coupled to the outer cover.

4. The feature inspection lighting system of claim 1, further comprising a removable diffuser coupled to the outer cover.

5. The feature inspection lighting system of claim 1 wherein:
    the outer periphery of the outer cover is generally rectangular with four corner regions, and
    the plurality of light sources is arranged in a plurality of rings between the mounting structure and the outer periphery, with an additional light source located in each of the corner regions.

6. The feature inspection lighting system of claim 1, wherein the plurality of light sources are coupled to the outer cover by means of flexible substrates each including more than one light source.

7. The feature inspection lighting system of claim 6, wherein the flexible substrates are mounted to raised surfaces defined on the inner surface of the outer cover.

8. The feature inspection lighting system of claim 7, wherein the flexible substrates each include a connector for electrically connecting the light sources to a power source.

9. The feature inspection lighting system of claim 8, further comprising cables for connecting the connectors to the power source, the cables being routed behind the flexible substrates between the raised surfaces.

10. The feature inspection lighting system of claim 9, further comprising a fixed diffuser coupled to the outer cover.

11. The feature inspection lighting system of claim 9, further comprising a removable diffuser coupled to the outer cover.

12. A feature inspection lighting system, comprising:
    an outer cover having a mounting structure at a first end thereof and defining an outer periphery at a second end thereof, the outer cover including an inner surface between the first end and the second end, raised surfaces being defined on the inner surface;
    a plurality of light sources coupled to the raised surfaces of the inner surface of the outer cover; and
    cables to provide electrical power to the plurality of light sources, the cables being routed between the raised surfaces of the outer cover.

13. The feature inspection lighting system of claim 12 wherein the light sources comprise at least ten individually addressable light sources.

14. The feature inspection lighting system of claim 12 wherein the plurality of light sources are coupled to the raised surfaces by flexible substrates, the cables being routed between the raised surfaces of the outer cover underneath the flexible substrates.

15. The feature inspection lighting system of claim 12 wherein:
   the outer periphery of the outer cover is generally rectangular with four corner regions, and
   the plurality of light sources is arranged in a plurality of rings between the mounting structure and the outer periphery, with an additional light source located in each of the corner regions.

16. The feature inspection lighting system of claim 12, further comprising an inner cover coupled to the outer cover, the inner cover having apertures defined therein corresponding to positions of the plurality of light sources.

17. The feature inspection lighting system of claim 12, further comprising a fixed diffuser coupled to the outer cover.

18. The feature inspection lighting system of claim 12, further comprising a removable diffuser coupled to the outer cover.

19. The feature inspection lighting system of claim 12, wherein the outer periphery of the outer cover has a cutout defined therein through which all or part of an object to be inspected can pass.

* * * * *